United States Patent [19]

Jeppsson et al.

[11] 4,448,324
[45] May 15, 1984

[54] CONTAINER CLOSURE HAVING WEAKER OPENING MEANS

[75] Inventors: Jan B. Jeppsson, Lomma; Zoltan Pollak, Lund, both of Sweden

[73] Assignee: AB Akerlund & Rausing, Sweden

[21] Appl. No.: 491,020

[22] Filed: May 3, 1983

[30] Foreign Application Priority Data

May 10, 1982 [SE] Sweden ............................ 8202917-4

[51] Int. Cl.³ ...................... B65D 17/34; B65D 17/40
[52] U.S. Cl. .................................... 220/266; 220/270; 220/276; 264/328.1
[58] Field of Search ............... 220/266, 269, 270, 276; 264/328.1, 130

[56] References Cited

U.S. PATENT DOCUMENTS

| | | | |
|---|---|---|---|
| 3,499,572 | 3/1970 | Rueklerg | 220/270 |
| 4,210,618 | 7/1980 | Piltz et al. | 264/130 |
| 4,212,409 | 7/1980 | Jeppson | 220/270 |
| 4,267,937 | 5/1981 | Piltz et al. | 220/270 |

Primary Examiner—George T. Hall
Attorney, Agent, or Firm—Lerner, David, Littenberg, Krumholz & Mentlik

[57] ABSTRACT

A container closure of the composite type comprising a supporting and protecting part of plastics, having a central panel and a circumferential flange, and a thin metal foil acting as sealing label, attached to said part.

A tearing denotation is formed in a multi step injection moulded weld zone and a sealing label is arranged to cover at least the weld zone of the container part. The weld zone includes abutment surfaces of the sequentially moulded parts acting as stop members preventing free relative movement between said parts after the weld zone is broken.

22 Claims, 11 Drawing Figures

CONTAINER CLOSURE HAVING WEAKER OPENING MEANS

FIELD OF THE INVENTION

The present invention relates to containers and more precisely to a container having a tearable away portion, or at least a portion providing access to the interior of the container.

Parts of the actual type, for instance container covers, are frequently manufactured from plastics material and usually by injection moulding. The possibility of opening up and at least partially removing a container portion providing access to the interior of the container, generally is accomplished by reducing the thickness of the material of the container cover along a tearing denotation or by leaving narrow bridges of a tearing denotation that is cut through for the rest.

BACKGROUND OF THE INVENTION

Available techniques within the present field involve a one step injection moulding process resulting in cover portions located inside as well as outside of the tearing denotation. The injection ingate generally is located centrally in the mould and the material flows more or less radially outwards in the cover to be moulded, across the tearing denotation and then continues essentially in the same direction for forming a flange to be attached to a container casing.

However, it has been recognized that the one step moulding technique does not provide an acceptable tearing possibility, especially when the plastics material is of the type forming long chains of oriented molecules when stretched or otherwise oriented. Unfortunately, the one step technique gives exactly such stretching-/orientation in the tearing region of a cover of the actual type.

It is known that polypropylene, especially, is very difficult to tear. The tearing is made more difficult due to the fact that the molecule chains are oriented across the tearing denotation exactly in the regions where tearing is to be carried out. There is also suggested a sequential moulding process resulting in a weld zone of reduced strength defining a tearing denotation of a cover.

Within the present technical field, there have been proposed composite closures, for instance a cover having a relatively thick supporting and protecting part of plastics and a thin metal foil attached to said part. Such closures advantageously may be used in applications demanding extremely low gas and vapor transmission characteristics, as for instance is the case in packages of the retortable type.

There is also a need for providing easy opening facilities in such composite structures.

Available closures of this type are composite structures comprising a supporting and protecting plastics element, normally having a central panel and a circumferential flange, and a metal foil laminate attached to the plastics element. The panel is delimited from the flange by a denotation, usually comprising regions exposing the foil to the outside of the closure. Such exposed regions are very difficult to avoid when trying to arrange the structure for easy opening in the true meaning thereof.

Additionally, the need for exposed regions involves a puncture risk of the foil and lowers the strength of the overall container.

In practice, the need for exposed regions has prevented moulding of the protecting and supporting plastics part directly onto the thin metal foil. The foil is not able to withstand stretching and other strains that will occur when pressing down the foil by fingers or other mechanical means for forming exposed regions.

Notwithstanding the easy opening condition, there is also a pronounced need for an overall container structure that withstands internal pressure, for instance from carbonated soft drinks.

SUMMARY OF THE INVENTION

Surprisingly, it has been found that multi step injection moulding techniques applied to composite closures of the type identified obviate all main drawbacks of prior art closures.

The invention provides a container part, preferably a container cover, tearable along a tearing denotation formed essentially in a weld zone of plastics material obtained by injection moulding. The weld zone is a multi step injection moulded zone, and a sealing label, for instance a metal foil, is arranged to cover at least the weld zone of the container part.

In order to meet also the requirements for increased overall strength and resistance against internal pressure, the weld zone includes a region, forming abutment surfaces of sequentially moulded parts, said surfaces acting as stop members preventing free relative movement between said parts after the weld zone is broken.

Preferably, the weld zone is a zone having broken orientation of molecule chains of said plastics material and/or a zone of incomplete fusing together of plastics material.

In a practical embodiment, the weld zone is arranged in a cover panel of a container cover provided with a circumferential flange for application around a mouth of the container, and the sealing label extends over the entire panel surface and at least partially into the flange.

The sealing label may extend through the weld zone and cover a portion of the opposite side of the closure.

Advantageously, the weld zone has a crosswise extension through said part other than perpendicular, for instance an extension having a step like configuration where the step counteracts outwards movement of said container part.

In a practical embodiment, the entire container part is manufactured from the same type of material, for instance polypropylene.

The invention provides also a method of manufacturing a container part, preferably a cover, openable along a tearing denotation, wherein a first container part, for instance a cover panel, is injection moulded of plastics material as a first step, and thereafter a second part, for instance an edge flange encompassing the cover panel and arranged for being attached to a container casing, is injection moulded while forming a weld zone between the two parts, said moulding steps being carried out onto a sealing label, for instance a metal foil, arranged to cover at least the weld zone of the container part.

Preferably, the method is such that the injection moulding of the second part is carried out so that the molecule chains of said plastics material essentially are broken in the weld zone and/or so that the temperature of the plastics material in the first and second container parts, respectively, is maintained at a lower level than required for a complete fusing together.

The pressure resistance characteristics is realized by practising the method such that the injection moulding of the first and second parts is carried out so that the weld zone is given a crosswise extension through said part other than perpendicular, for instance an extension having a step like configuration where the step counteracts outwards movement of said container part.

DESCRIPTION OF PREFERRED EMBODIMENTS

Figure 1:
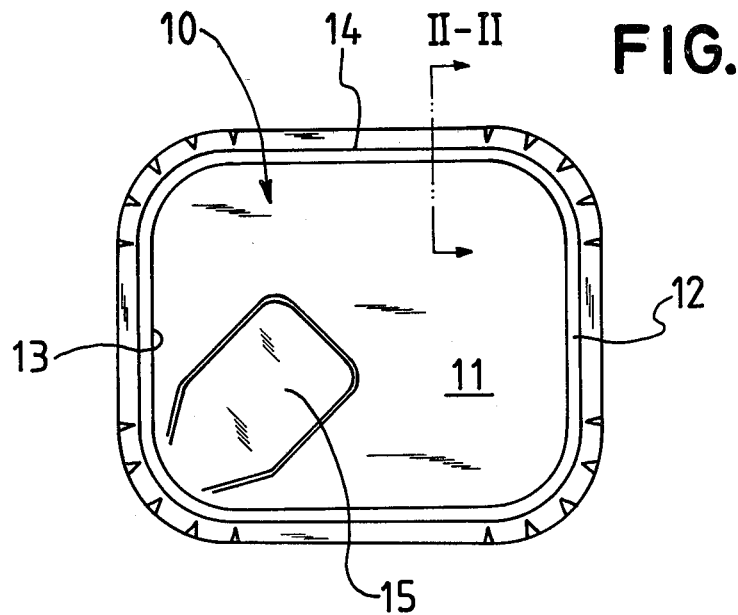
FIG. 1 in a view from above shows a container cover of the easy openable type.
Figure 2:
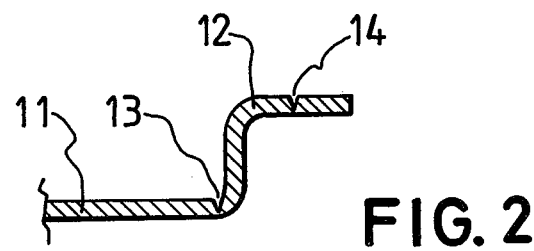
FIG. 2 is a section along line II—II in FIG. 1 and shows a first type of weld zone.

The container cover 10 in FIG. 1 basically comprises a cover panel 11 and a circumferential flange 12. Between such elements, for instance consisting of polypropylene, there is a tearing denotation 13, in FIG. 2 in the shape of a restriction of reduced wall thickness and in FIG. 3 in the shape of a zigzag region.

The placement of the tearing denotation corresponds to a position just inside a container mouth arranged for receiving a cover 10. A circumferential groove 14 in the flange facilitates the folding down of the flange against the external side of the container.

The placement of the tearing denotation 13 as such relative the flange and cover panel may vary. It is for instance possible to place the tearing denotation 13 externally or internally relative the container casing, and if so desired along the end edge of the container casing.

In the embodiment disclosed in FIG. 1, the cover 10 is provided with a grip tongue 15 arranged for being lifted and at the pointed portion thereof released from the flange 12, and by pulling the tongue removed from the flange together with the cover panel 11 along the tearing denotation 13.

Instead of having a grip tongue 15 it is of course possible to use a pull ring, placed internally or externally, dependent on the placement of the tearing denotation.

As will be described more in detail in connection with FIGS. 4 to 9, it is also possible to use an arrangement where a metal foil (sealing label) located under the cover is punctured and partly removed together with the cover panel and possibly a portion of the cover flange.

However, in all embodiments the container cover is such that the tearing denotation 13 is located within a weld zone obtained by injection moulding separately a flange 12 or flange part and a cover panel 11, including an eventual opening device, respectively.

Basically, the weld zone may be obtained in different ways. A mould may for instance be arranged with a so called core pulling program taking due consideration of the required sequence and temperature, pressure and time conditions for providing a flange 12 and a cover panel 11, respectively, interconnected along a weld zone 13 or tearing denotation in the form of for instance a restriction, bridges, zigzag line, etc.

Said parameters are set empirically with consideration of opening easiness/mechanical strength.

Presently, however, it is assumed that the primary reason for the improved tearing characteristics is related to the broken orientation of the molecule chains in the weld zone obtained by the multi step process for manufacturing the cover panel and flange.

It is also assumed that a temperature condition in the weld zone corresponding to a temperature lower than required for complete fusing together adds to the result.

It is also possible that tensions built in by the temperature difference contribute to the weaking necessary for tearing.

Although, presently a complete technical explanation of the obtainable result is lacking, it is, however, fully clear that the cover structure proposed not merely improves the tearing but offers also a higher degree of freedom as far as the placement of the tearing denotation 13 is concerned.

Figure 3:
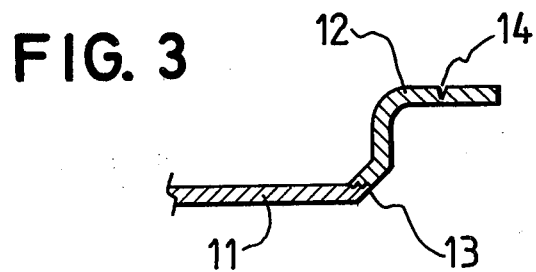
FIG. 3 shows another type of weld zone, FIG. 4 in a partial section view shows a composite type of container cover, FIG. 5 in a partial section view shows a modified type of composite container cover, FIG. 6 in a partial section shows a sandwich type of a composite cover, FIGS. 7 to 9 in partial section views show various types of weld zone and sealing label arrangements, FIG. 10 in section and schematically shows an injection molding gear during the first step of a multi step injection moulding process.

In FIG. 3, for instance, in a first embodiment there is shown a placement allowing exposure to internal pressure. The weld zone 13 extends along a zigzag line oriented in a plane different from the vertical plane for improving the resistance against internal pressure.

As will be explained in connection with some of the embodiments in FIGS. 4 to 9, the shape of the weld zone may be designed to give a mechanical coupling between the parts along the weld zone, but a coupling which does not harmfully deteriorate the tearing if the tearing is accomplished by using a tearing force having a force component also in a plane other than crosswise the cover panel.

Figure 4:
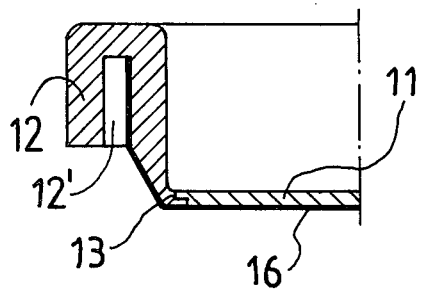

In FIG. 4 the weld zone 13 between the cover panel 11 and the flange 12 is formed as a step like zone, where the interaction of steps of complementary shape provides a mechanical coupling between panel 11 and flange 12 and forms stop members preventing free relative movement of the cover panel 11 after the weld zone is broken.

There is also a sealing label 16, a thin metal foil laminate, at the lower panel surface and extending partially into the groove 12' formed in the flange and arranged for accomodating a container casing. The composite structure comprising sealing label 16, cover panel 11 and flange 12 is manufactured by using a two step injection moulding process and moulding the cover elements 11 and 12 directly onto the sealing label.

Several weld zone configurations are possible by modifying the mould and/or arranging a core program. The FIG. 4 embodiment requires a mould element of male type having a step like front portion for forming the step 13. Preferably, the flange 12 is moulded in a first step and therafter the panel 11 is formed.

Figure 5:
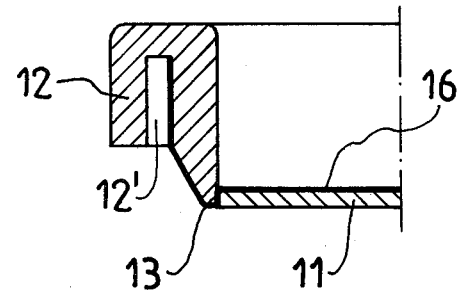
Figure 8:
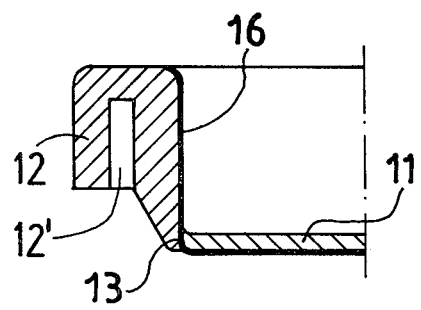
Figure 9:
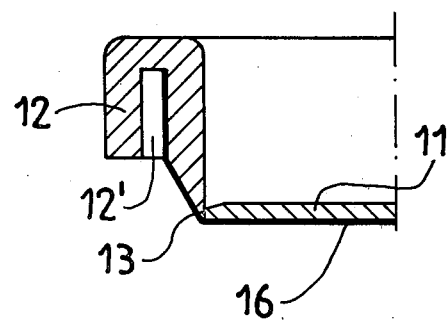

As appears from FIGS. 5 and 8, the sealing label 16 may extend on both sides of panel 11 and flange 12. The crossing-over region coincides with the weld zone 13.

At least the embodiments in FIGS. 4 to 7 disclose weld zones having positively acting stop members between panel 11 and flange 12 after the weld zone is broken. It is understood that the shape of such stop member is determined by the edge configuration of either element 11 and 12. Each such element is formed during a certain step of the multi step injection moulding process.

Figure 6:
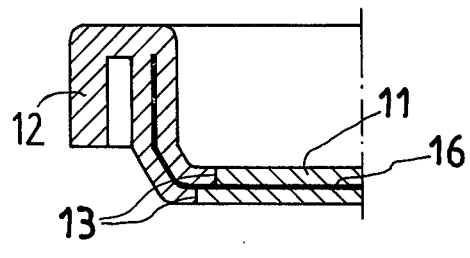
Figure 7:
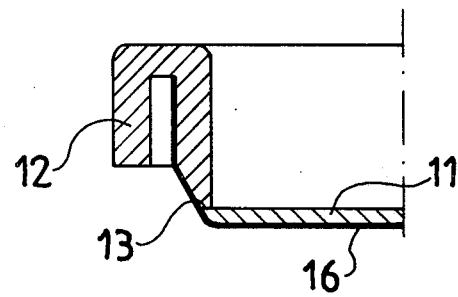

The embodiment in FIG. 6 represents a sandwich type of a composite cover structure provided with a double set of abutment surfaces forming stop members in the double weld zone 13.

Figure 10:
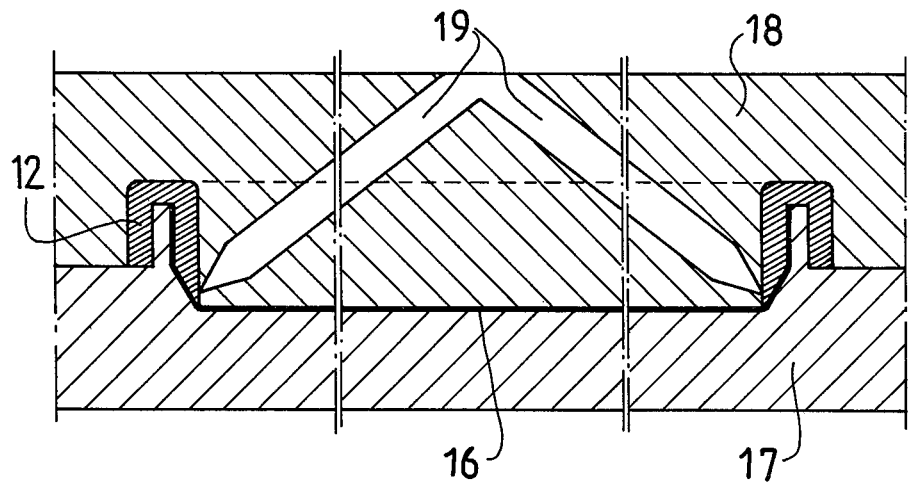
Figure 11:
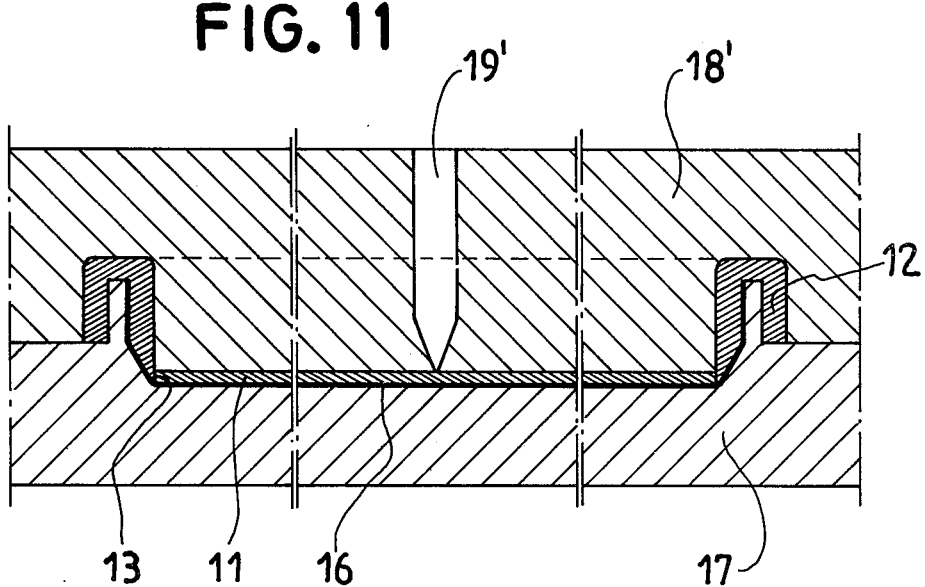
FIG. 11 shows the moulding gear during the following moulding step.

In FIG. 10 there is shown a sealing label 16 placed in the female part 17 of a mould for injection moulding. A male part 18 is provided with ingate channels 19 for forming the flange 12 during a first step of a two step injection moulding process. Thereafter, another part 18' of the male element is placed in a position as in FIG. 11 for forming the cover panel 11 by injection moulding through a further ingate 19' located centrally relative the flange 12. In the particular case, the weld zone 13 is placed just inside the double flange 12.

Temperature conditions and pressure are determined empirically such that the molecule chains of the plastics material are broken and/or such that the temperature of the plastics material is maintained at a lower level than required in the weld zone for complete fusing together.

We claim:

1. A container element comprising first and second injection molded portions and a tear line therebetween, said tear line comprising a weld zone comprising the area of direct contact between said first and second injection molded portions, said first injection molded portion including first and second elongated surfaces corresponding to the molds within which said first injection molded portion was formed, and said second injected molded portion including first and second surfaces corresponding to the molds within which said second injection molded portion was formed, whereby said weld zone comprises the area of direct contact between said first injection molded portion and said second injection molded portion.

2. The container element of claim 1, wherein said second injection molded portion is substantially planar, and said weld zone is at least partially disposed substantially parallel to said plane of said second injection molded portion whereby after said weld zone has been broken said surface of said first injection molded portion which formed said weld zone acts as a stop member preventing free relative movement between said first and second injection molded portions in a direction substantially perpendicular to said plane.

3. The container element of claim 1, wherein the area between said first and second surfaces of said second injection molded portion defines an end surface for said second injection molded portion, and wherein said weld zone has a surface area substantially corresponding to said end surface of said second injection molded portion.

4. The container element of claim 1, wherein said second injection molded portion comprises a substantially planar cover panel for a container, and wherein said first injection molded portion comprises a circumferential flange for application around the mouth of said container.

5. The container element of claim 1, wherein said first and second injection molded portions both comprise the same plastic material.

6. The container element of claim 5, wherein said plastic material comprises polypropylene.

7. A container element comprising first and second injection molded portions, and a tear line therebetween, said tear line comprising a weld zone between said first and second injection molded portions, and a sealing label member extending from said first injection molded portion to said second injection molded portion so as to overlap said weld zone therebetween.

8. The container element of claim 7, wherein said weld zone comprises the area of direct contact between said first and second injection molded portions.

9. The container element of claim 7, wherein said sealing label comprises metal foil.

10. The container element of claim 7, wherein said second injection molded portion is substantially planar, and wherein said weld zone is at least partially disposed substantially parallel to said plane in which said second injection molded portion lies whereby after said weld zone has been broken said surface of said first injection molded portion which formed said weld zone acts as a stop member preventing free relative movement between said first and second injection molded portions in a direction substantially perpendicular to said plane.

11. The container element of claim 7, wherein said second injection molded portion includes first and second elongated surfaces corresponding to the molds within which said second injection molded portion was formed, and wherein the area between said first and second surfaces of said second injection molded portion defines an end surface for said second injection molded portion, and wherein said weld zone has a surface area substantially corresponding to said entire end surface of said second injection molded portion.

12. The container element of claim 7, wherein said second injection molded portion comprises a substantially planar cover panel for a container, and wherein said first injection molded portion comprises a circumferential flange for application around the mouth of said container.

13. The container element of claim 12, wherein said sealing label member extends over the entire surface of said first injection molded portion, and at least partially into said second injection molded portion.

14. The container element of claim 7, wherein said sealing label member extends through said weld zone so as to pass through the plane in which said weld zone lies, whereby at least a portion of said sealing label member is located on either face of said first and second injection molded portions.

15. The container element of claim 7, wherein said first and second injection molded portions both comprise the same plastic material.

16. The container element of claim 15, wherein said plastic material comprises polypropylene.

17. A method of manufacturing a container element comprising injection molding a first injection molded portion, and subsequently injection molding a second injection molded portion so as to form a weld zone between said first and second injection molded portions in the area of direct contact between said first and second injection molded portions.

18. The method of claim 17, wherein said injection molding steps are carried out at temperatures lower than the temperatures required for complete fusing together of said first and second injection molded portions.

19. The method of claim 17, wherein said injection molding of said second injection molded portion is carried out so as to produce a substantially planar second injection molded portion having first and second elongated surfaces and an end surface defined therebetween, and wherein said injection molding of said first injection molded portion is carried out so as to include at least a portion extending beyond said end surface of said second injection molded portion.

20. The method of claim 17, wherein said second injection molded portion comprises a cover member for a container and wherein said first injection molded portion comprises a circumferential flange for application to said container.

21. The method of claim 17 including applying a sealing label to said container element prior to said injection molding of said second injection molded portion whereby said sealing label member extends from said first injection molded portion to said second injection molded portion so as to overlap said weld zone therebetween.

22. The method of claim 21, wherein said sealing label comprises metal foil.

* * * * *